United States Patent
Duan et al.

(10) Patent No.: US 12,444,071 B2
(45) Date of Patent: Oct. 14, 2025

(54) METHOD, DEVICE, AND SYSTEM FOR DETECTING SIZE OF BATTERY COMPOSITE SURFACE

(71) Applicant: CONTEMPORARY AMPEREX TECHNOLOGY (HONG KONG) LIMITED, Hong Kong (CN)

(72) Inventors: Pengfei Duan, Ningde (CN); Dajun Ni, Ningde (CN); Jun Hu, Ningde (CN); Hongyuan Li, Ningde (CN); Shiping Feng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/592,881

(22) Filed: Mar. 1, 2024

(65) Prior Publication Data
US 2024/0202955 A1 Jun. 20, 2024

Related U.S. Application Data

(63) Continuation of application No. PCT/CN2022/085399, filed on Apr. 6, 2022.

(51) Int. Cl.
*G06T 7/62* (2017.01)
*G06T 7/00* (2017.01)
(Continued)

(52) U.S. Cl.
CPC ............... *G06T 7/62* (2017.01); *G06T 7/001* (2013.01); *G06T 7/13* (2017.01); *G06T 7/337* (2017.01); *H04N 23/60* (2023.01); *H04N 23/90* (2023.01)

(58) Field of Classification Search
None
See application file for complete search history.

(56) References Cited

U.S. PATENT DOCUMENTS

2018/0337410 A1\* 11/2018 Lee ..................... H01M 4/8896
2020/0212494 A1    7/2020 Kim et al.
(Continued)

FOREIGN PATENT DOCUMENTS

CN    109636717 A    4/2019
CN    111539943 A    8/2020
(Continued)

OTHER PUBLICATIONS

The European Patent Office (EPO) the Extended European Search Report for Application No. 22936099.5 Sep. 30, 2024 7 Pages.
(Continued)

*Primary Examiner* — Eileen M Adams
(74) *Attorney, Agent, or Firm* — ANOVA LAW GROUP, PLLC

(57) ABSTRACT

A dimension detection method for a battery composite surface includes: acquiring image information of a cathode sheet, the image information including an image of a first surface of the cathode sheet and an image of a second surface opposite to the first surface; acquiring image information of a composite sheet which includes a non-composite surface and a composite surface, the non-composite surface being formed by compounding the first surface of the cathode sheet, an anode, and a separator, the composite surface being formed by compounding the second surface of the cathode sheet, the anode, and the separator, and the image information of the composite sheet including image information of the non-composite surface; and calculating dimension information of the composite surface by an image processing algorithm, according to the image information of the cathode sheet and the image information of the composite sheet.

11 Claims, 6 Drawing Sheets

(51) Int. Cl.
*G06T 7/13* (2017.01)
*G06T 7/33* (2017.01)
*H04N 23/60* (2023.01)
*H04N 23/90* (2023.01)

(56) References Cited

U.S. PATENT DOCUMENTS

2020/0370882 A1    11/2020   June et al.
2024/0311995 A1*    9/2024   Masuch ................. H01M 4/04

FOREIGN PATENT DOCUMENTS

| CN | 112053326 A | 12/2020 |
| CN | 112215825 A | 1/2021 |
| CN | 112577421 A | 3/2021 |
| EP | 3565052 A1 | 11/2019 |
| JP | 2017054813 A | 3/2017 |
| KR | 20130064853 A | 6/2013 |
| KR | 20190126524 A | 11/2019 |
| WO | 2016114257 A1 | 7/2016 |
| WO | 2016208679 A1 | 12/2016 |
| WO | 2018182129 A1 | 10/2018 |
| WO | 2021112481 A1 | 6/2021 |

OTHER PUBLICATIONS

The World Intellectual Property Organization (WIPO) International Search Report and Written Opinion for PCT/CN2022/085399 Jan. 9, 2023 11 Pages (including translation).
The Japan Patent Office (JPO) Notice of Reasons for Refusal for Application No. 2024-510714 Apr. 1, 2025 6 Pages (including translation).
The Korean Intellectual Property Office Notice of Submission of Opinion for Application No. 10-2024-7006399 Aug. 14, 2025 24 Pages (including translation).

* cited by examiner

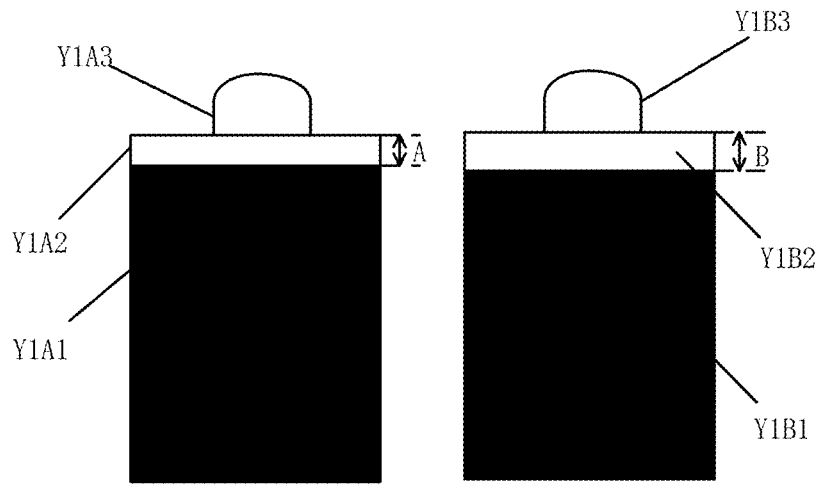
FIG. 5a     FIG. 5b
FIG. 5
FIG. 6

METHOD, DEVICE, AND SYSTEM FOR DETECTING SIZE OF BATTERY COMPOSITE SURFACE

CROSS-REFERENCE TO RELATED APPLICATIONS

This application is a continuation of international application PCT/CN2022/085399, filed on Apr. 6, 2022, the entire content of which is incorporated herein by reference.

TECHNICAL FIELD

The present application relates to the technical field of batteries, and in particular to a dimension detection method, device and system for a composite surface of a battery (i.e., a method, a device, and a system for detecting a size of a battery composite surface).

BACKGROUND ART

At present, the power battery lamination process is generally used to form a laminated battery, wherein the anode of the formed laminated battery is compounded with one surface of a separator, and the other surface of the separator is compounded with the cathode, which results in that dimensions of the composite surfaces cannot be inspected due to that the composite surfaces formed by the anode, separator and cathode of the laminated battery is not visible. However, if the dimension of the composite surface does not meet the requirements, it may cause a short circuit of the battery, which may bring serious safety problems to the battery.

SUMMARY

In view of the above problems, the present application provides a dimension detection method, device and system for a composite surface of a battery, which can solve the safety problem existing due to that the composite surface of a laminated battery cannot be inspected due to the invisible composite surface.

In a first aspect, the present application provides a dimension detection method for a composite surface of a battery. The method includes: acquiring image information of a cathode sheet, wherein the image information of the cathode sheet includes an image of a first surface of the cathode sheet and an image of a second surface opposite to the first surface; acquiring the image information of the composite sheet, wherein the composite sheet includes a non-composite surface and a composite surface, the non-composite surface is formed by compounding the first surface of the cathode sheet, an anode and a separator, the composite surface is formed by compounding the second surface of the cathode sheet, the anode and the separator, and the image information of the composite sheet includes image information of the non-composite surface; and calculating, through an image processing algorithm, the dimension information of the composite surface according to the image information of the cathode sheet and the image information of the composite sheet.

In the technical solution of the embodiment of the present application, this solution first acquires the image of the first surface of the cathode sheet and the image of the second surface of the cathode sheet, then obtains the image of the non-composite surface of the composite sheet, and then calculates, through an image recognition algorithm, the dimension information of the composite surface according to the image of the first surface of the cathode sheet, the image of the second surface of the cathode sheet, and the image of the non-composite surface. Since the non-composite surface of the composite sheet is formed by compounding the first surface of the cathode sheet, the anode sheet and the separator, the composite surface is formed by compounding the second surface of the cathode sheet, the anode sheet and the separator. This solution can identify the dimension difference between the first surface and second surface of the cathode sheet based on the image of the first surface of the cathode sheet and the image of the second surface of the cathode sheet, and then identify the dimension of the non-composite surface though the image information of the non-composite surface, so as to obtain the dimension information of the composite surface based on the dimension of the non-composite surface in combination with the dimension difference between the first surface and second surface of the cathode sheet, solving the safety problem existing due to that the dimension of the composite surface of a laminated battery cannot be inspected due to the invisible composite surface, thus realizing the dimension measurement of the composite surface of the laminated battery and improving the safety of the laminated battery.

In some embodiments, the dimension information of the composite surface includes a distance from the cathode edge to the anode edge in the composite surface.

In some embodiments, the calculating through an image processing algorithm the dimension information of the composite surface according to the image information of the cathode sheet and the image information of the composite sheet includes: calculating misalignment amount through the image processing algorithm, according to the image of the first surface of the cathode sheet and the image of the second surface, wherein the misalignment amount indicates the difference between the distance from the cathode edge to the ceramic edge of the first surface of the cathode sheet and the distance from the cathode edge to the ceramic edge of the second surface of the cathode sheet; calculating the distance from the cathode edge to the anode edge in the non-composite surface according to the image information of the composite sheet; and calculating the distance from the cathode edge to the anode edge in the composite surface according to the misalignment amount and the distance from the cathode edge to the anode edge in the non-composite surface. In the embodiment of the present application, by calculating the misalignment amount of the first surface and the second surface of the cathode sheet and then calculating the distance from the cathode edge to the anode edge in the composite surface according to the distance from the cathode edge to the anode edge in the non-composite surface and the misalignment amount, the short-circuit safety problem existing due to substandard distance from the cathode edge to the anode edge in the composite surface is avoided, which improves the safety of the laminated battery.

In some embodiments, the calculating misalignment amount through the image processing algorithm according to the image of the first surface of the cathode sheet and the image of the second surface includes: identifying and calculating, through the image processing algorithm, the first distance from the cathode edge to the ceramic edge of the first surface of the cathode sheet according to the image of the first surface of the cathode sheet; identifying and calculating a second distance from the cathode edge to the ceramic edge of the second surface of the cathode sheet according to the image of the second surface of the cathode sheet; and calculating the difference between the first distance and the second distance to obtain the misalignment amount.

In some embodiments, the identifying and calculating through the image processing algorithm the first distance from the cathode edge to the ceramic edge of the first surface of the cathode sheet according to the image of the first surface of the cathode sheet includes: identifying the cathode edge and the ceramic edge in the image of the first surface of the cathode sheet through the image recognition algorithm; and calculating the distance from the identified cathode edge to the ceramic edge to obtain the first distance. In the embodiment of the present application, the first distance from the cathode edge to the ceramic edge of the first surface of the cathode sheet and the second distance from the cathode edge to the ceramic edge of the first surface of the cathode sheet are respectively identified and calculated through the image recognition algorithm, based on the acquired image of the first surface and the image of the second surface of the cathode sheet, so that the misalignment amount is calculated based on the first distance and the second distance, thus the misalignment amount is calculated based on the rapid image recognition, improving the dimension detection efficiency of the composite surface.

In some embodiments, the image information of the composite sheet includes multiple composite sheet images, each composite sheet image includes one corner of the composite sheet, different composite sheet images contain different corners of the composite sheet, and the calculating the distance from the cathode edge to the anode edge in the non-composite surface according to the image information of the composite sheet includes: calculating, according to each composite sheet image, the distance from the cathode edge to the anode edge of the non-composite surface in the corresponding composite sheet image. The calculating the distance from the cathode edge to the anode edge in the composite surface according to the misalignment amount and the distance from the cathode edge to the anode edge in the non-composite surface includes: calculating the difference between the misalignment amount and the distance from the cathode edge to the anode edge of the non-composite surface corresponding to each composite sheet image, and obtaining the distance from the cathode edge to the anode edge of the composite surface in the each composite sheet image. In the embodiment of the present application, in the case that the composite sheet is too large and pictures shot by a single camera is blurred or the shooting accuracy is not enough, the dimension detection of the composite surface of a large-dimension composite sheet can be achieved by shooting each corner of the composite sheet to obtain multiple composite sheet images and then calculating, for each composite sheet image, the distance from the cathode edge to the anode edge of the corresponding composite surface.

In some embodiments, after the calculating through an image processing algorithm the dimension information of the composite surface according to the image information of the cathode sheet and the image information of the composite sheet, the method further includes: judging whether the dimension information of the composite surface satisfies a preset standard; and generating a re-inspection reminder for the composite sheet when the dimension information of the composite surface does not meet the preset standard. In the embodiment of the present application, after calculating the dimension information of the composite surface, it is judged whether the dimension information of the composite surface satisfies the preset standard, and a re-inspection is carried out if the preset standard is not met, so as to avoid that the composite sheet that does not meet the standard performs subsequent cell operations, which results in cost waste and safety problems brought about by unqualified cell production.

In some embodiments, the acquiring image information of the cathode sheet includes: controlling a first camera and a second camera to shoot the first surface and the second surface of the cathode sheet, to obtain the image of the first surface of the cathode sheet and the image of the second surface opposite to the first surface, wherein positions where the first camera and the second camera are provided include: two sides of a cathode sheet conveying device.

In some embodiments, the acquiring image information of the composite sheet includes: acquiring the serial number of the cathode sheet; determining number of a to-be-triggered camera module according to the serial number of the cathode sheet; and controlling, according to the number of the to-be-triggered camera module, the corresponding camera module to shoot the composite sheet, to obtain multiple composite sheet images, wherein multiple groups of the camera modules are included, and the multiple groups of camera modules are provided at two sides of the composite sheet conveying device, the camera module numbers corresponding to different groups of cameral modules are different, and each group of camera modules includes at least two third cameras.

In a second aspect, the present application provides a dimension detection device for a composite surface of a battery, including: an acquisition module and an image processing module, wherein the acquisition module is configured to acquire image information of the cathode sheet, wherein the image information of the cathode sheet includes the image of the first surface of the cathode sheet and the image of the second surface opposite to the first surface; the acquisition module is further configured to acquire the image information of the composite sheet, wherein the composite sheet includes a non-composite surface and a composite surface; the non-composite surface is formed by compounding the first surface of the cathode sheet, the anode and the separator, and the composite surface is formed by compounding the second surface of the cathode sheet, the anode and the separator; the image information of the composite sheet includes the image information of the non-composite surface; and the image processing module is configured to calculate, through the image processing algorithm, the dimension information of the composite surface according to the image information of the cathode sheet and the image information of the composite sheet.

In the technical solution of the embodiment of the present application, this solution first acquires the image of the first surface of the cathode sheet and the image of the second surface of the cathode sheet, then acquires the image of the non-composite surface of the composite sheet, and then calculates, through an image recognition algorithm, the dimension information of the composite surface according to the image of the first surface of the cathode sheet, the image of the second surface of the cathode sheet, and the image of the non-composite surface. Since the non-composite surface of the composite sheet is formed by compounding the first surface of the cathode sheet, the anode sheet and the separator, the composite surface is formed by compounding the second surface of the cathode sheet, the anode sheet and the separator. This solution can identify the dimension difference between the first surface and second surface of the cathode sheet based on the image of the first surface of the cathode sheet and the image of the second surface of the cathode sheet, and then identify the dimension of the non-composite surface though the image information of the non-composite surface, so as to obtain the dimension information of the composite surface based on the dimension of the non-composite surface in combination with the dimension difference between the first surface and second surface of the cathode sheet, solving the safety problem existing due to that the dimension of the composite surface of a laminated battery cannot be inspected due to the invisible composite surface, thus realizing the dimension measurement of the composite surface of the laminated battery and improving the safety of the laminated battery.

In some embodiments, the dimension information of the composite surface includes a distance from the cathode edge to the anode edge in the composite surface. The image processing module is specifically used to calculate misalignment amount through the image processing algorithm, according to the image of the first surface of the cathode sheet and the image of the second surface, wherein the misalignment amount indicates the difference between the distance from the cathode edge to the ceramic edge of the first surface of the cathode sheet and the distance from the cathode edge to the ceramic edge of the second surface of the cathode sheet; calculate the distance from the cathode edge to the anode edge in the non-composite surface according to the image information of the composite sheet; and calculate the distance from the cathode edge to the anode edge in the composite surface according to the misalignment amount and the distance from the cathode edge to the anode edge in the non-composite surface.

In some embodiments, the image processing module is further specifically configured to identify and calculate, through an image processing algorithm, the first distance from the cathode edge to the ceramic edge of the first surface of the cathode sheet according to the image of the first surface of the cathode sheet; identify and calculate the second distance from the cathode edge to the ceramic edge of the second surface of the cathode sheet according to the image of the second surface of the cathode sheet; and calculate the difference between the first distance and the second distance to obtain the misalignment amount.

In some embodiments, the image processing module is further specifically configured to identify the cathode edge and the ceramic edge in the image of the first surface of the cathode sheet through the image recognition algorithm; and calculate the distance from the identified cathode edge to the ceramic edge to obtain the first distance.

In some embodiments, the image information of the composite sheet includes multiple composite sheet images, each composite sheet image includes one corner of the composite sheet, different composite sheet images contain different corners of the composite sheet, and the image processing module is also specifically configured to calculate, according to each composite sheet image, the distance from the cathode edge to the anode edge of the non-composite surface in the corresponding composite sheet image; and calculating the difference between the misalignment amount and the distance from the cathode edge to the anode edge of the non-composite surface corresponding to each composite sheet image, and acquire the distance from the cathode edge to the anode edge of the composite surface in the each composite sheet image.

In some embodiments, the device further includes a judging module configured for judging whether the dimension information of the composite surface meets a preset standard; and a generation module configured for generating a re-inspection reminder for the composite sheet when the judging module determines that the dimension information of the composite surface does not meet the preset standard.

In some embodiments, the acquisition module is specifically configured to control a first camera and a second camera to shoot the first surface and the second surface of the cathode sheet, to obtain the image of the first surface of the cathode sheet and the image of the second surface opposite to the first surface, wherein positions where the first camera and the second camera are provided include: two sides of a cathode sheet conveying device.

In some embodiments, the acquisition module is further specifically configured to obtain the serial number of the cathode sheet; determine the number of a to-be-triggered camera module according to the serial number of the cathode sheet; and control, according to the number of the to-be-triggered camera module, the corresponding camera module to shoot the composite sheet, to obtain multiple composite sheet images, wherein multiple groups of the camera modules are included, and the multiple groups of camera modules are provided at two sides of the composite sheet conveying device, the camera module numbers corresponding to different groups of cameral modules are different, and each group of camera modules includes at least two third cameras.

In a third aspect, the present application provides an electronic device, including a memory and a processor, the memory stores computer programs, and the processor is configured to execute, when executing the computer programs, the first aspect and any optional implementation in the first aspect.

In a fourth aspect, the present application provides a computer-readable storage medium, on which computer programs are stored, wherein when the computer programs are executed by a processor, the first aspect and any optional implementation in the first aspect are executed.

In a fifth aspect, the present application provides a computer program product, wherein the computer program product, when running on a computer, causes the computer to execute the first aspect and any optional implementation in the first aspect.

In the sixth aspect, the present application provides a dimension detection system for a composite surface of a battery, including at least one camera module, a conveying device, and a data processing device, wherein the data processing device is electrically connected to the at least one camera module; the conveying device is configured to convey the cathode sheet and the composite sheet, wherein the composite sheet includes a non-composite surface and a composite surface; the non-composite surface is formed by compounding the first surface of the cathode sheet, the anode and the separator, and the composite surface is formed by compounding the second surface of the cathode sheet, the anode and the separator; the data processing device is configured to control the at least one camera module to shoot the cathode sheet on the conveying device to obtain the image information of the cathode sheet, wherein the image information of the cathode sheet includes the image of the first surface of the cathode sheet and the image of the second surface opposite to the first surface; the data processing device is further configured to control the at least one camera module to shoot the composite sheet on the conveying device to obtain the image information of the composite sheet, wherein the image information of the composite sheet includes the image information of the non-composite surface; the data processing device is further configured to calculate, through an image processing algorithm, the dimension information of the composite surface according to the image information of the cathode sheet and the image information of the composite sheet.

In the technical solution of the embodiment of the present application, the camera module of this solution is designed to obtain the image of the first surface of the cathode sheet and the image of the second surface of the cathode sheet, then obtain the image of the non-composite surface of the composite sheet, and then use the data processing device to calculate, through an image recognition algorithm, the dimension information of the composite surface according to the image of the first surface of the cathode sheet, the image of the second surface of the cathode sheet, and the image of the non-composite surface, wherein since the non-composite surface of the composite sheet is formed by compounding the first surface of the cathode sheet, the anode sheet and the separator, and the composite surface is formed by compounding the second surface of the cathode sheet, the anode sheet and the separator, this solution can identify the dimension difference between the first surface and second surface of the cathode sheet based on the image of the first surface of the cathode sheet and the image of the second surface of the cathode sheet, then identify the dimension of the non-composite surface through the image information of the non-composite surface, so that the dimension information of the composite surface can be obtained based on the dimension of the non-composite surface in combination with the dimension difference between the first surface and second surface of the cathode sheet, solving the safety problem existing due to that the dimension of the composite surface of a laminated battery cannot be inspected due to the invisible composite surface, thus realizing the dimension measurement of the composite surface of the laminated battery and improving the safety of the laminated battery.

The above description is only an overview of the technical solution of the present application. In order to better understand the technical means of the present application, it may be implemented according to the contents of the description, and in order to make the above and other purposes, features and advantages of the present application more obvious and understandable, embodiments of the present application are specifically listed below.

BRIEF DESCRIPTION OF DRAWINGS

Various other advantages and benefits will become apparent to those of ordinary skill in the art upon reading the following detailed description of some embodiments. The drawings are only for the purpose of illustrating some embodiments and are not to be considered as limiting the present application. Also, the same reference numerals are used to denote the same components throughout the drawings. In the drawings:

FIG. 5 is a schematic structural view of the first surface and the second surface of a cathode sheet provided by the present application;

FIG. 6 is a schematic structural view of the non-composite surface of a composite sheet provided by the present application;

Figure 1:
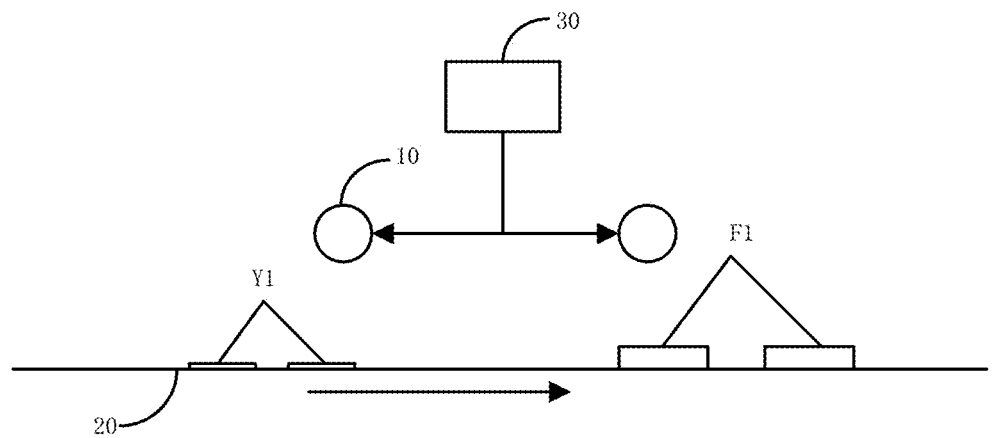
FIG. 1 is a first schematic structural view of a dimension detection system for a composite surface of a battery provided by the present application.

The reference numerals in the embodiments are as follows:

10—camera module; 110—first camera group; 120—second camera group; 20—conveying device; 210—cathode sheet conveying device; 220—composite sheet conveying device; 30—data processing device; 1000—acquisition module; 1100—image processing module; 1200—judging module; 1300—generation module; 14—electronic device; 1401—processor; 1402—memory; 1403—communication bus; Y1—cathode sheet; Y1A1—polar region of the first surface of the cathode sheet; Y1A2—ceramic region of the first surface of the cathode sheet; Y1A3—tab on the first surface of the cathode sheet; Y1B1—polar region of the second surface of the cathode sheet; Y1A2—ceramic region of the second surface of the cathode sheet; Y1A30 tab of the second surface of the cathode sheet; Y2—anode sheet; G1—separator; F1—composite sheet.

DETAILED DESCRIPTION OF EMBODIMENTS

Embodiments of the technical solutions of the present application will be described in detail below in conjunction with the drawings. The following embodiments are only used to illustrate the technical solutions of the present application more clearly, and therefore are only examples, rather than limiting the protection scope of the present application.

Unless otherwise defined, all technical and scientific terms used herein have the same meaning as commonly understood by those skilled in the technical field of the present application. The terms used herein are only for the purpose of describing embodiments, and are not intended to limit the present application. Terms "comprising" and "having" and any variations thereof in the specification and claims of the present application and the above description of the drawings are intended to cover a non-exclusive inclusion.

In the description of the embodiments of the present application, technical terms such as "first" and "second" are only used to distinguish different objects, and should not be understood as indicating or implying importance in relativity or implicitly indicating the number, specific sequence, or primary-subordinate relationship of the indicated technical features. In the description of the embodiments of the present application, "multiple" means two or more, unless otherwise clearly and specifically defined.

Reference made herein to "embodiment" means that a particular feature, structure, or characteristic described in connection with the embodiment may be included in at least one embodiment of the present application. The phases occurring in various places in the specification do not necessarily all refer to the same embodiment, nor are separate or alternative embodiments mutually exclusive of other embodiments. It is understood explicitly and implicitly by those skilled in the art that the embodiments described herein can be combined with other embodiments.

In the description of the embodiment of the present application, the term "and/or" indicates only an association relationship describing associated objects, meaning that there may be three kinds of relationships. For example, A and/or B may indicate three situations: there is only A, there are A and B simultaneously, and there is only B. In addition, the character "/" herein generally indicates that the associated objects therebefore and thereafter have an "or" relationship.

In the description of the embodiments of this application, the term "multiple" refers to more than two (including two), similarly, "multiple groups" refers to two or more groups (including two groups), and "multiple pieces" refers to more than two pieces (including two pieces).

In the description of the embodiments of the present application, the orientation or positional relationship indicated by technical terms "center", "longitudinal", "lateral", "length", "width", "thickness", "upper", "lower", "front", "rear", "left", "right", "vertical" "horizontal", "top", "bottom", "inner", "outer", "clockwise", "counterclockwise", "axial", "radial", "circumferential", etc. is based on orientation or positional relationship shown in the drawings, only for the convenience of describing the embodiments of the present application and simplifying the description, rather than indicating or implying that the device or element referred to must have a specific orientation, or be constructed and operated in a specific orientation, and therefore cannot be understood as a limitation on the embodiments of the present application.

In the description of the embodiments of this application, unless otherwise clearly specified and defined, technical terms such as "installation", "link", "connection" and "fixation" should be understood in a broad sense. For example, it may be fixed connection, or also be detachable connection, or integral connection; it may also be mechanical connection, or electrical connection; it may be direct connection, or indirect connection through an intermediary, or it may be internal communication between two components or interaction relationship between the two components. Those of ordinary skill in the art can understand the specific meanings of the above terms in the embodiments of the present application according to specific situations.

At present, power batteries are mostly formed by two processes: winding and lamination. The battery formed by the lamination process is called a laminated battery. For the laminated battery, generally, a composite sheet is formed by compounding a separator on the outer layer of the anode sheet, and then compounding a cathode sheet on the outer layer of the separator.

The inventors have noticed that the current dimension detection for laminated batteries in the market is generally dimension detection for a non-composite surface, i.e., a visible surface after compounding the anode sheet, separator and cathode sheet, while for the composite surface, i.e., the invisible surface after compounding the anode sheet, separator and the cathode sheet, the relevant detection technology is still in a blank stage. However, the dimension of the composite surface and that of the non-composite surface are equally important. If the dimension of the composite surface does not meet the requirements, it is likely to cause a short circuit of the battery, resulting in the safety problem of the battery. For example, the distance between the cathode sheet edge and the anode sheet edge is made to be too small during compounding of the lamination process, such that it cannot reach the set distance standard. In this case, it is likely to cause a short circuit of the battery due to that the cathode sheet is too close to the anode sheet.

The inventors found through researches that before compounding the cathode sheet and the separator, the first surface and second surface of the cathode sheet are shot to obtain image information of two surfaces of the cathode sheet, then based on the image information of the two surfaces of the cathode sheet, the dimension difference between the two surfaces of the cathode sheet can be identified, the image information of the composite sheet after compounding the cathode sheet and the separator is acquired, then the dimension information of the non-composite surface, i.e., the visible surface of the composite sheet, is identified through the image information of the composite sheet, and then the dimension information of the composite surface of the composite sheet can be detected through calculation based on the dimension difference between the two surfaces of the cathode sheet and the dimension information of the non-composite surface, thus realizing the dimension detection of the composite surface of the composite sheet of the laminated battery.

After in-depth researches, the inventors designed a dimension detection method for the composite surface of the battery, which realizes the dimension detection of the composite surface of the composite sheet by acquiring images of two surfaces of the cathode sheet and the image of the non-composite surface of the composite sheet, thereby solving the safety problem existing due to that the dimension cannot be inspected due to the invisible composite surface of the laminated battery, and improving the safety of the laminated battery.

The dimension detection method for the composite surface of a battery disclosed in the embodiment of the present application can be applied to a data processing device, the data processing device including but not limited to computing equipment such as processor, computer, and server. The data processing device can be integrated into the dimension detection system for the composite surface of a battery, so as to realize the online dimension detection of the composite surface of the composite sheet during the production process of the composite sheet of the laminated battery.

As a possible implementation, as shown in FIG. 1, the dimension detection system for the composite surface of a battery may include camera modules 10, a conveying device 20 and a data processing device 30, and the data processing device 30 is electrically connected to the camera modules 10.

The conveying device 20 is used to convey the cathode sheet(s) Y1 and the composite sheet(s) F1. The composite sheet F1 includes a non-composite surface and a composite surface. The non-composite surface is formed by compounding the first surface of the cathode sheet Y1, the anode Y2 and the separator G1, and the composite surface is formed by compounding the second surface of the cathode sheet Y1, the anode Y2 and the separator G1. The data processing device 30 can control the camera module 10 to shoot the cathode sheet Y1 and the composite sheet F1 to obtain the image of the first surface of the cathode sheet Y1, the image of the second surface of the cathode sheet Y1 and the image of the non-composite surface of the composite sheet F1, so as to calculate, through the image processing algorithm, the dimension information of the composite surface according to the image of the first surface of the cathode sheet, the image of the second surface of the cathode sheet and the image of the non-composite surface of the composite sheet.

Figure 2:
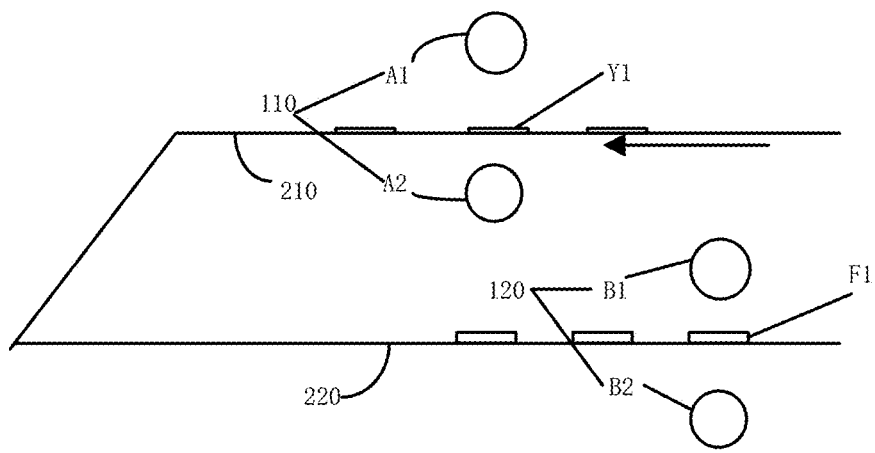
FIG. 2 is a second schematic structural view of the dimension detection system for a composite surface of a battery provided by the present application.

As a specific implementation, as shown in FIG. 2, the conveying device 20 may include a cathode sheet conveying device 210 and a composite sheet conveying device 220, wherein the cathode sheet conveying device 210 drives the cathode sheet Y1 to move to make it compounded with the anode and the separator, to form the composite sheet F1 which is conveyed to the next processing station through the composite sheet conveying device 220.

On the basis of the conveying device designed above, the camera module 10 designed in this solution may include a first camera group 110 and a second camera group 120, the first camera group 110 may specifically be composed of a camera A1 and a camera A2, and the camera A1 and the camera A2 are distributed at two sides of the cathode sheet conveying device 210, and the cathode sheet conveying device 210 can be designed to be hollowed out, so that the camera A1 and camera A2 distributed at the two sides can shoot different surfaces of the cathode sheet Y1, thereby acquiring images of the first surface of the cathode sheet Y1 and the second surface of the cathode sheet. Since a plurality of cathode sheets Y1 are conveyed on the cathode sheet conveying device 210, a plurality of composite sheets F1 are conveyed on the composite sheet conveying device 220 also, and two surfaces of each of the composite sheets F1 are both compounded with a cathode sheet Y1, on this basis, the second camera group 120 can include two groups of camera modules B1 and B2, the camera modules B1 and B2 can include at least two cameras respectively, and the camera modules B1 and B2 can be arranged at two sides of the composite sheet conveying device 220, on this basis, in order to make the cathode sheets corresponding to the composite sheets, this solution can design a corresponding cathode sheet serial number for each cathode sheet, and when the composite sheet formed by compounding the cathode sheet is conveyed to positions of the camera modules B1 and B2, the corresponding serial number can be identified, and then the camera module B1 or B2 may be triggered to perform shooting, so as to obtain the image of the composite sheet corresponding to at least one cathode sheet.

Figure 3:
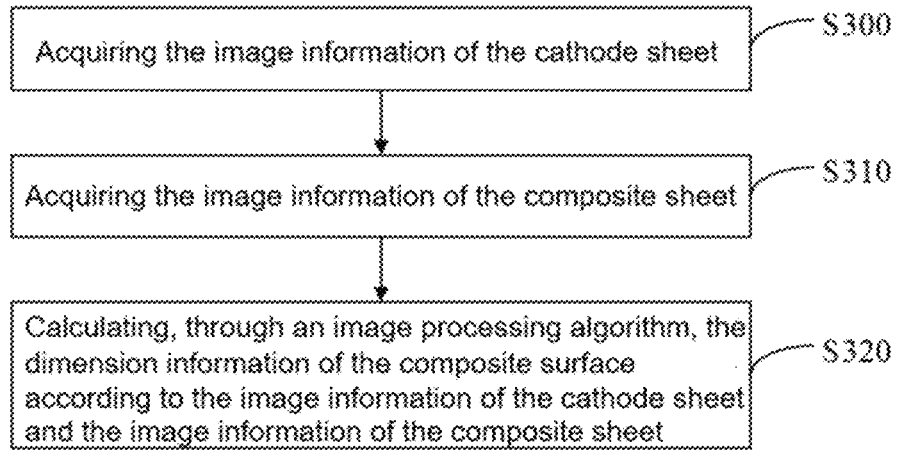
FIG. 3 is a first flow chart of a dimension detection method for a composite surface of a battery provided by the present application.

The present application provides a dimension detection method for the composite surface of a battery, which can be applied to the aforementioned data processing device 30, thereby realizing the dimension detection of the composite surface, as shown in FIG. 3, including:

Step S300: acquiring the image information of the cathode sheet.

Step S310: acquiring the image information of the composite sheet.

Step S320: calculating, through an image processing algorithm, the dimension information of the composite surface according to the image information of the cathode sheet and the image information of the composite sheet.

In the above embodiment, the image information of the cathode sheet includes the image of the first surface of the cathode sheet and the image of the second surface opposite to the first surface; the first surface of the cathode sheet, the anode sheet and the separator are compounded to form the non-composite surface of the composite sheet, and the second surface of the cathode sheet, the anode sheet and the separator are compounded to form the composite surface of the composite sheet. Since the non-composite surface of the composite sheet is visible, the image information of the composite sheet acquired in step S310 is the image information of the non-composite surface. In the above, the way of acquiring the image information of the cathode sheet can include controlling the cameras at two sides of the cathode sheet conveying device to perform shooting respectively, and the way of acquiring the image information of the composite sheet can include controlling the camera modules at two sides of the composite sheet conveying device to perform shooting, as mentioned above.

On the basis of the above, the data processing device calculates, through the image processing algorithm, the dimension information of the composite surface according to the image information of the cathode sheet and the image information of the composite sheet. In the above, the dimension information of the composite surface includes but not limited to the distance from the edge of the cathode sheet to the edge of the anode sheet in the composite surface, the distance from the edge of the cathode sheet to the edge of the composite sheet in the composite surface, and the like.

Specifically, the data processing device can identify, through the image recognition algorithm, the dimension difference between the first surface and the second surface of the cathode sheet based on the image of the first surface of the cathode sheet and the image of the second surface of the cathode sheet, and then identify the dimension of the non-composite surface through the image information of the non-composite surface. Since the non-composite surface is formed by compounding the first surface of the cathode sheet, the anode sheet and the separator, and the composite surface is formed by compounding the second surface of the cathode sheet, the anode sheet and the separator, the dimension difference between the first surface and the second surface of the cathode sheet can reflect the dimension difference between the composite surface and the non-composite surface of the composite sheet, so that the dimension information of the composite surface can be obtained based on the dimension of the non-composite surface in combination with the dimension difference between the first surface and the second surface of the cathode sheet.

In the dimension detection method for the composite surface of the battery designed above, this solution first acquires the image of the first surface of the cathode sheet and the image of the second surface of the cathode sheet, then acquires the image of the non-composite surface of the composite sheet, and then calculate, through the image recognition algorithm, the dimension information of the composite surface according to the image of the first surface of the cathode sheet, the image of the second surface of the cathode sheet and the image of the non-composite surface. Since the non-composite surface of the composite sheet is formed by compounding the first surface of the cathode sheet, the anode sheet and the separator, and the composite surface is formed by compounding the second surface of the cathode sheet, the anode sheet and the separator, this solution can identify the dimension difference between the first surface and second surface of the cathode sheet based on the image of the first surface of the cathode sheet and the image of the second surface of the cathode sheet, and then identify the dimension of the non-composite surface through the image information of the non-composite surface, so as to obtain the dimension information of the composite surface based on the dimension of the non-composite surface in combination with the dimension difference between the first surface and second surface of the cathode sheet, solving the safety problem existing due to that the dimension of the composite surface of the laminated battery cannot be inspected due to the invisible composite surface, thus realizing the dimension measurement of the composite surface of the laminated battery and improving the safety of the laminated battery.

Figure 4:
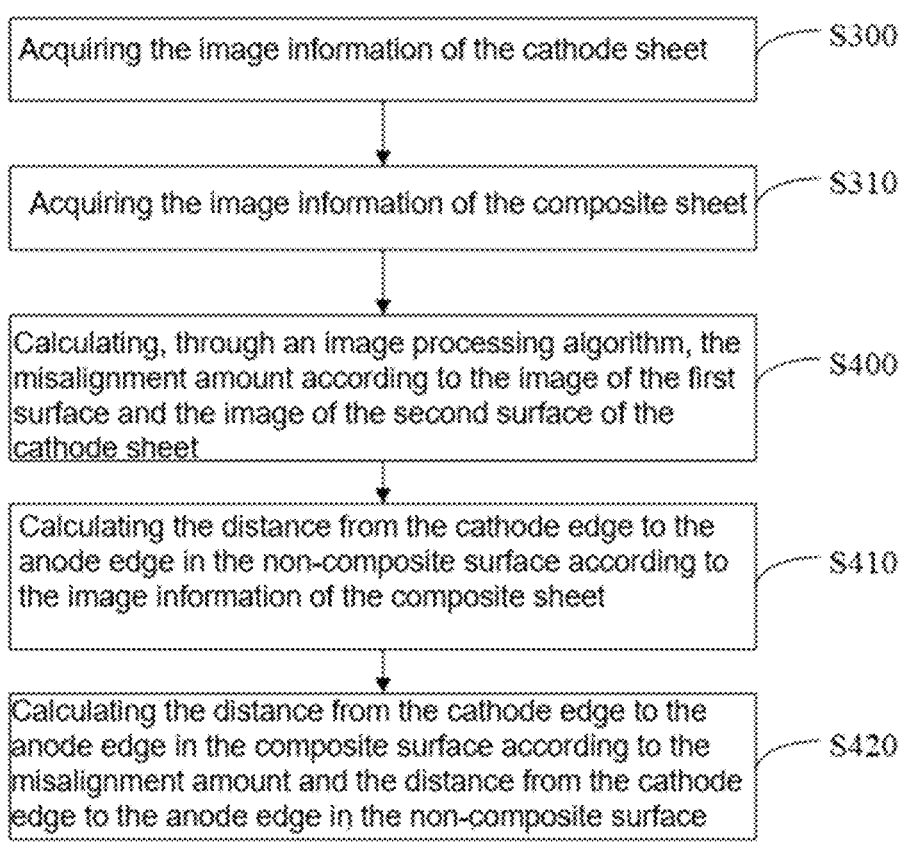
FIG. 4 is a second flow chart of the dimension detection method for a composite surface of a battery provided by the present application.

According to some embodiments of the present application, the dimension information of the composite surface described above includes the distance from the edge of the cathode sheet to the edge of the anode sheet in the composite surface, and the distance from the edge of the cathode sheet to the edge of the anode sheet in the composite surface indicates the spacing between the cathode and anode of the battery. There may be a short circuit problem if the spacing is too small. Therefore, it is needed to detect the distance from the edge of the cathode sheet to the edge of the anode sheet in the composite surface. On this basis, as shown in FIG. 4, the aforementioned step 320 may include the following steps:

Step S400: calculating, through an image processing algorithm, the misalignment amount according to the image of the first surface and the image of the second surface of the cathode sheet.

Step S410: calculating the distance from the cathode edge to the anode edge in the non-composite surface according to the image information of the composite sheet.

Step S420: calculating the distance from the cathode edge to the anode edge in the composite surface according to the misalignment amount and the distance from the cathode edge to the anode edge in the non-composite surface.

In step S400, the misalignment amount indicates the difference between the distance from the cathode edge to the ceramic edge of the first surface of the cathode sheet and the distance from the cathode edge to the ceramic edge of the second surface of the cathode sheet. Specifically, as shown in FIG. 5, FIG. 5*a* is a schematic view of the first surface of the cathode sheet Y1, the first surface of the cathode sheet Y1 includes the polar region Y1A1 of the first surface of the cathode sheet, the ceramic region Y1A2 of the first surface of the cathode sheet, and the tab Y1A3 of the first surface of the cathode sheet; and FIG. 5*b* is a schematic view of the second surface of the cathode sheet Y1, the second surface of the cathode sheet Y1 includes three portions: the polar region Y1B1 of the second surface of the cathode sheet, the ceramic region Y1B2 of the second surface of the cathode sheet, and the tab Y1B3 of the second surface of the cathode sheet. The misalignment amount indicates the difference between the distance A from the edge of the polar region Y1A1 of the first surface of the cathode sheet to the edge of the ceramic region Y1A2 of the first surface of the cathode sheet and the distance B from the edge of the polar region Y1B1 of the second surface of the cathode sheet and the edge of the ceramic region Y1B2 of the second surface of the cathode sheet, that is, the misalignment amount=A—B.

In step S410, the image information of the composite sheet is the image information of the non-composite surface of the composite sheet. On this basis, the solution can identify the distance from the cathode edge to the anode edge in the image information of the non-composite surface through an image recognition algorithm. Specifically, the non-composite surface of the composite sheet is as shown in FIG. 6. The separator is widest, the anode is the second widest, and the cathode is narrowest. The separator wraps the anode, and the anode wraps the cathode. The non-composite surface contains the first surface of the cathode sheet, the anode sheet and the separator. The distance D from the cathode edge to the anode edge in the non-composite surface can be identified through the image information of the non-composite surface.

On the basis of the above, this solution can calculate the distance from the cathode edge to the anode edge in the composite surface based on the misalignment amount and the distance from the cathode edge to the anode edge in the non-composite surface. Specifically, since the misalignment amount indicates the difference between the distance A from the edge of the polar region to the edge of the ceramic region of the first surface of the cathode sheet and the distance B from the edge of the polar region to the edge of the ceramic region of the second surface of the cathode sheet, and the distance D from the cathode edge to the anode edge in the non-composite surface presents the distance from the edge of the polar region of the first surface of the cathode sheet to the edge of the anode sheet, on this basis, it only needs to subtract the misalignment amount from the distance D from the cathode edge to the anode edge in the non-composite surface to obtain the distance from the edge of the polar region of the second surface of the cathode sheet to the edge of the anode sheet, i.e., obtain the distance from the cathode edge to the anode edge in the composite surface.

Figure 7:
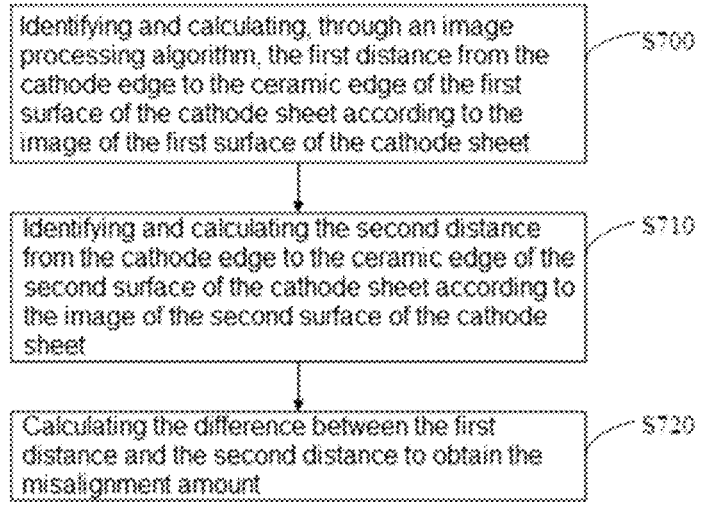
FIG. 7 is a third flow chart of the dimension detection method for a composite surface of a battery provided by the present application.

According to some embodiments of the present application, for the aforementioned misalignment amount, as shown in FIG. 7, this solution can perform calculation by using the following manner.

Step S700: identifying and calculating, through an image processing algorithm, the first distance from the cathode edge to the ceramic edge of the first surface of the cathode sheet according to the image of the first surface of the cathode sheet.

Step S710: identifying and calculating the second distance from the cathode edge to the ceramic edge of the second surface of the cathode sheet according to the image of the second surface of the cathode sheet.

Step S720: calculating the difference between the first distance and the second distance to obtain the misalignment amount.

In step S700, the solution can identify and calculate the first distance from the cathode edge to the ceramic edge of the first surface of the cathode sheet through the image of the first surface of the cathode sheet, the first distance being the aforementioned distance A. As a possible implementation, this solution can first identify the cathode edge and the ceramic edge in the image of the first surface of the cathode sheet through an image recognition algorithm, and then calculate the distance from the cathode edge to the ceramic edge to obtain the first distance. Specifically, the colors of the cathode edge and the ceramic edge are different, the cathode edge is usually white to gray, the ceramic edge is usually white, and the edge is a straight line, so the cathode edge and the ceramic edge may be identified by way of straight line fitting plus color distinction; and since the cathode edge and the ceramic edge are generally parallel straight lines as shown in FIG. 5, the spacing between the two may be calculated. i.e., the distance from the cathode edge to the ceramic edge may be acquired, thereby obtaining the first distance.

In step S710, the distance from the cathode edge and the ceramic edge in the image of the second surface of the cathode sheet can be calculated in the same manner as in step S700, to obtain the second distance, i.e., the aforementioned distance B.

Based on the foregoing, the difference between the first distance A and the second distance B can be calculated, so as to obtain the misalignment amount. That is, the misalignment amount=A−B.

In the embodiment of the present application, the first distance from the cathode edge to the ceramic edge of the first surface of the cathode sheet and the second distance from the cathode edge to the ceramic edge of the first surface of the cathode sheet are respectively identified and calculated, through the image recognition algorithm, based on the acquired image of the first surface and the image of the second surface of the cathode sheet, so that the misalignment amount is calculated based on the first distance and the second distance, so that the misalignment amount is calculated based on rapid image recognition, improving the efficiency of dimension detection of the composite surface.

According to some embodiments of the present application, for step S410 of calculating the distance from the cathode edge to the anode edge in the non-composite surface according to the image information of the composite sheet, as a possible implementation, this solution can also identify the cathode edge and anode edge of the non-composite surface through the way of straight line fitting plus color distinction as shown in 700, and thereby obtain, through calculation, the distance from the cathode edge to the anode edge.

Figure 8:
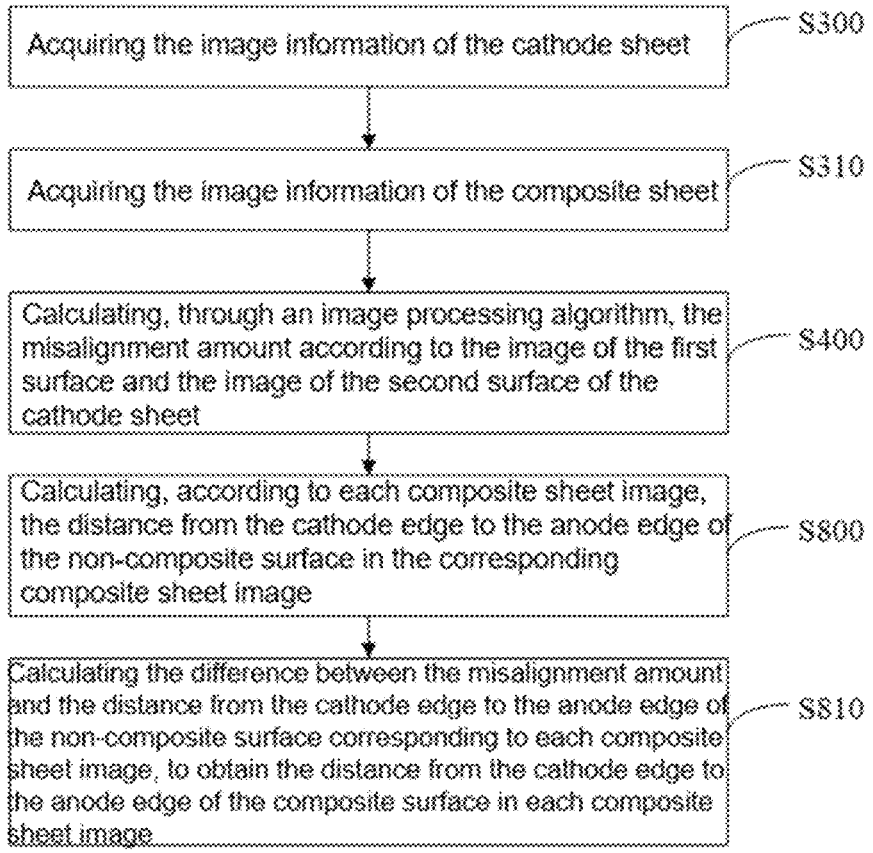
FIG. 8 is a fourth flow chart of the dimension detection method for a composite surface of a battery provided by the present application.

As another possible implementation, the dimension of the composite sheet is generally large, and the image information of the non-composite surface obtained by shooting the composite sheet with a single camera may be blurred or not accurate enough. On this basis, this solution can obtain multiple composite sheet images by multiple cameras shooting the composite sheet, wherein the multiple cameras may be provided at one side of the composite sheet conveying device, each composite sheet image includes one corner of the composite sheet, and different composite sheet images contain different corners of the composite sheet. Specifically, in this solution, the 4 corners of the composite sheet may be shot by 4 cameras respectively, and the image information of each of the 4 corners of the composite sheet may be obtained respectively. On this basis, step S410, as shown in FIG. 8, may be implemented through the following method, including:

Step S800: calculating, according to each composite sheet image, the distance from the cathode edge to the anode edge of the non-composite surface in the corresponding composite sheet image.

On the basis of the above, for step S420, it can be realized by the following method:

Step S810: calculating the difference between the misalignment amount and the distance from the cathode edge to the anode edge of the non-composite surface corresponding to each composite sheet image, to obtain the distance from the cathode edge to the anode edge of the composite surface in each composite sheet image.

In the foregoing embodiment, for each composite sheet image, the distance from the cathode edge to the anode edge of the non-composite surface in the corresponding image is calculated, and then the distance from the cathode edge to the anode edge of corresponding composite surface is calculated based on the misalignment amount and the distance from the cathode edge to the anode edge of the non-composite surface corresponding to the each composite sheet image. On this basis, only when the distance from the cathode edge to the anode edge of the composite surface corresponding to the each composite sheet image meets the requirements, it can be ensured that the dimension of the composite surface meet the requirements.

In the embodiment of the present application, when the composite sheet is too large and pictures shot by a single camera is blurred or the shooting accuracy is not enough, multiple composite sheet images are obtained by shooting each corner of the composite sheet, and then for each composite sheet image, the distance from the cathode edge to the anode edge of corresponding composite surface is calculated, so as to realize the dimension detection of the composite surface of the large-dimension composite sheet.

Figure 9:
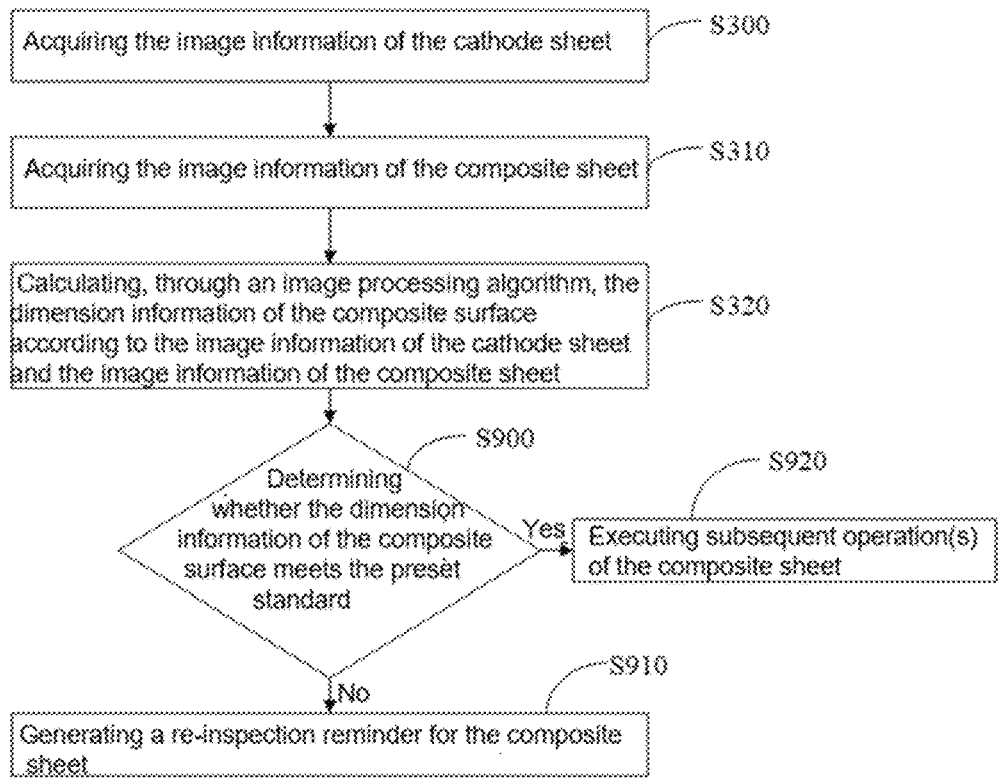
FIG. 9 is a fifth flow chart of the dimension detection method for a composite surface of a battery provided by the present application.

According to some embodiments of the present application, after the step S120 of calculating dimension information of the composite surface, as shown in FIG. 9, the solution may further include the following steps:

Step S900: determining whether the dimension information of the composite surface meets the preset standard, wherein if not, step S910 is entered; and if yes, step S920 is entered.

Step S910: generating a re-inspection reminder for the composite sheet.

Step S920: executing subsequent operation(s) of the composite sheet.

In this embodiment, this solution sets the dimension standard of the composite surface in advance, and then judges whether the dimension information of the composite surface meets the preset standard, for example, judges whether the distance from the cathode edge to the anode edge in the composite surface is within the preset distance range, wherein if it is not within the preset distance range, it means that the dimension information of the composite surface does not meet the preset standard, and a re-inspection reminder for the composite sheet is generated to remind the staff to perform re-inspection, or a waste discharge mechanism is controlled to perform waste discharge operation on the composite sheet of which the dimension information does not satisfy the preset standard; and if it is within the preset distance range, it means that the dimension information of the composite surface meets the preset standard, and then the subsequent cell operation(s) is performed on the composite sheet.

In the embodiment of the present application, after calculating the dimension information of the composite surface, it is judged whether the dimension information of the composite surface satisfies the preset standard, and a re-inspection is carried out if the preset standard is not met, so as to avoid that the composite sheet which does not meet the standard is used to execute subsequent cell operation(s), resulting in cost waste and safety problem caused by unqualified cell production.

It should be noted that the above are all described taking, as an example, the dimension information of the composite surface being the distance from the cathode edge to the anode edge in the composite surface. The dimension information of the composite surface in the solution of the present application can also be other information of the composite surface, and the processing method thereof is similar to the above-mentioned processing method. For example, taking, as an example, the dimension information of the composite surface being the distance from the cathode edge in the composite surface to the edge of the composite sheet, first, the misalignment amount is also identified and calculated according to the image information of the first surface and the image information of the second surface of the cathode sheet (the calculation method of the misalignment amount is consistent with the above), on this basis, the distance from the cathode edge to the edge of the composite sheet in the non-composite surface can be identified through the image information of the non-composite surface, and then the distance from the cathode edge to the edge of the composite sheet can be obtained by subtracting the misalignment amount from the identified distance from the cathode edge to the edge of the composite sheet in the non-composite surface. In addition, for the dimension information of the composite surface, in addition to those described above, this solution can also detect other required dimension information in the composite surface, so as to realize the comprehensive detection of the dimension information of the composite surface.

Figure 10:
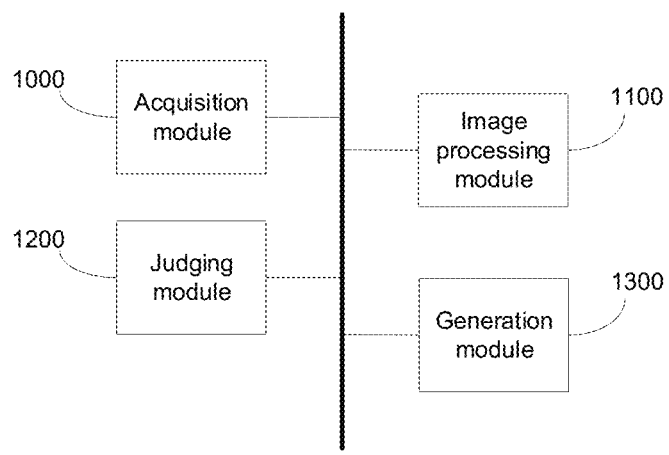
FIG. 10 is a schematic structural view of a dimension detection device for a composite surface of a battery provided by the present application.

FIG. 10 shows a schematic structural block diagram of a dimension detection device for the composite surface of a battery provided by the present application. It should be understood that the device corresponds to the method embodiments executed in FIG. 3 to FIG. 9, and can perform the steps involved in the aforementioned methods. For specific functions of the device, reference may be made to the above description, and in order to avoid repetition, detailed descriptions are appropriately omitted here. The device includes at least one software function module that can be stored in a memory in the form of software or firmware or hardened in an operating system (OS) of the device. Specifically, the device includes: an acquisition module 1000 and an image processing module 1100; the acquisition module 1000 is used to acquire image information of the cathode sheet, wherein the image information of the cathode sheet includes an image of the first surface of the cathode sheet and an image of the second surface opposite to the first surface; the acquisition module is also used to acquire the image information of the composite sheet; wherein the composite sheet includes a non-composite surface and a composite surface; the non-composite surface is formed by compounding the first surface of the cathode sheet, the anode and the separator, and the composite surface is formed by compounding the second surface of the cathode sheet, the anode and the separator; the image information of the composite sheet includes the image information of the non-composite surface; the image processing module 1100 is used to calculate, through the image processing algorithm, dimension information of the composite surface according to the image information of the cathode sheet and the image information of the composite sheet.

In the technical solution of the embodiment of the present application, this solution first acquires the image of the first surface of the cathode sheet and the image of the second surface of the cathode sheet, and then acquires the image of the non-composite surface of the composite sheet, and then calculates, through the image recognition algorithm, the dimension information of the composite surface according to the image of the first surface of the cathode sheet, the image of the second surface of the cathode sheet and the image of the non-composite surface. Since the non-composite surface of the composite sheet is formed by compounding the first surface of the cathode sheet, the anode sheet and the separator, and the composite surface is formed by compounding the second surface of the cathode sheet, the anode sheet and the separator, this solution can identify the dimension difference between the first surface and the second surface of the cathode sheet based on the image of the first surface of the cathode sheet and the image of the second surface of the cathode sheet, and then identify the dimension of the non-composite surface through the image information of the non-composite surface, so as to obtain the dimension information of the composite surface based on the dimension of the non-composite surface in combination with the dimension difference between the first surface and the second surface of the cathode sheet, solving the safety problem existing due to that the dimension of the composite surface of the laminated battery cannot be inspected due to invisible composite surface, thus realizing the dimension measurement of the composite surface of the laminated battery and improving the safety of the laminated battery.

According to some embodiments of the present application, optionally, the dimension information of the composite surface includes the distance from the cathode edge to the anode edge in the composite surface, and the image processing module 1100 is specifically configured to calculate, through an image processing algorithm, the misalignment amount according to the image of the first surface and the image of the second surface of the cathode sheet, wherein the misalignment amount indicates the difference between the distance from the cathode edge to the ceramic edge of the first surface of the cathode sheet and the distance from the cathode edge to the ceramic edge of the second surface of the cathode sheet; calculate the distance from the cathode edge to the anode edge in the non-composite surface according to the image information of the composite sheet; and calculate the distance from the cathode edge to the anode edge in the composite surface according to the misalignment amount and the distance from the cathode edge to the anode edge in the non-composite surface.

According to some embodiments of the present application, optionally, the image processing module 1100 is also specifically configured to identify and calculate, through an image processing algorithm, the first distance from the cathode edge to the ceramic edge of the first surface of the cathode sheet according to the image of the first surface of the cathode sheet; identify and calculate the second distance from the cathode edge to the ceramic edge of the second surface of the cathode sheet according to the image of the second surface of the cathode sheet; and calculate the difference between the first distance and the second distance to obtain the misalignment amount.

According to some embodiments of the present application, optionally, the image processing module 1100 is also specifically configured to identify the cathode edge and the ceramic edge in the image of the first surface of the cathode sheet through an image recognition algorithm; and calculate the distance from the identified cathode edge to the ceramic edge, to obtain the first distance.

According to some embodiments of the present application, optionally, the image information of the composite sheet includes a plurality of composite sheet images, each composite sheet image includes one corner of the composite sheet, and different composite sheet images contain different corners of the composite sheet, the image processing module 1100 is also specifically used to calculate, according to each composite sheet image, the distance from the cathode edge to the anode edge of the non-composite surface in the corresponding composite sheet image; and calculate the difference between the misalignment amount and the distance from the cathode edge to the anode edge of the non-composite surface corresponding to each composite sheet image, to obtain the distance from the cathode edge to the anode edge of the composite surface in each composite sheet image.

According to some embodiments of the present application, the device further includes a judging module 1200 configured for judging whether the dimension information of the composite surface meets the preset standard; and a generation module 1300 configured for generating a re-inspection reminder for the composite sheet when the judging module determines that dimension information of the composite surface does not meet the preset standard.

According to some embodiments of the present application, the acquisition module 1000 is specifically configured to control the first camera and the second camera to shoot the first surface and the second surface of the cathode sheet, to obtain the image of the first surface of the cathode sheet and the image of the second surface opposite to the first surface, wherein positions where the first camera and the second camera are provided include: two sides of the cathode sheet conveying device.

According to some embodiments of the present application, the acquisition module 1000 is also specifically used to acquire the serial number of the cathode sheet; determine the number of the to-be-triggered camera module according to the serial number of the cathode sheet; and control the corresponding camera module to shoot the composite sheet according to the number of the to-be-triggered camera module, to obtain multiple composite sheet images, wherein multiple groups of camera modules are provided, and the multiple groups of camera modules are provided at two sides of the composite sheet conveying device, and the camera module numbers corresponding to different groups of cameral modules are different, and each group of camera modules includes at least two third cameras.

Figure 11:
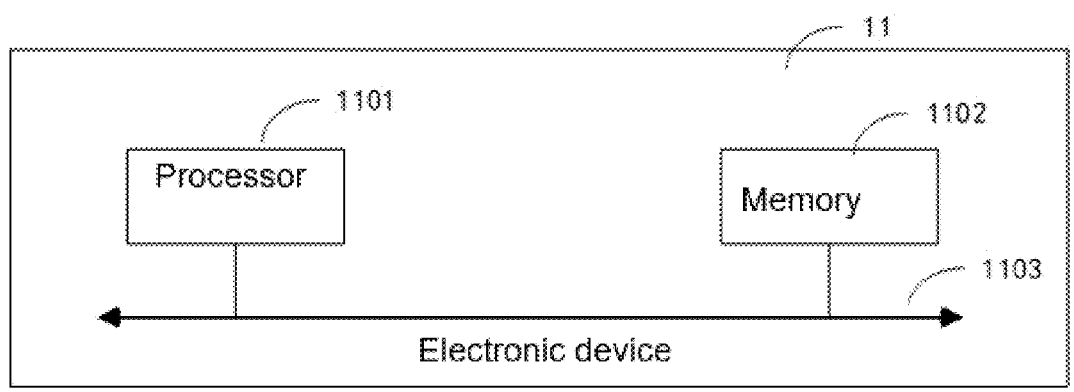
FIG. 11 is a schematic structural view of an electronic device provided by the present application.

According to some embodiments of the present application, as shown in FIG. 11, the present application provides an electronic device 11, including: a processor 1101 and a memory 1102, wherein the processor 1101 and the memory 1102 are connected with and communicate with each other through a communication bus 1103 and/or a connection mechanism of other forms (not marked), and the memory 1102 stores computer programs executable by the processor 1101. When the computing device is running, the processor 1101 executes the computer programs to execute the method executed by the external terminal machine in any optional implementation, for example, step S300 to step S330: acquiring the image information of the cathode sheet; acquiring the image information of the composite sheet; and calculating, through the image processing algorithm, the image information of the composite surface according to the image information of the cathode sheet and the image information of the composite sheet.

The present application provides a computer readable storage medium, on which computer programs are stored, wherein the computer programs execute the method in any one of the foregoing optional implementations when being run by the processor.

In the above, the storage medium can be realized by any type of volatile or non-volatile storage device or their combination, such as Static Random Access Memory (SRAM for short), Electrically Erasable Programmable Read-Only Memory (EEPROM for short), Erasable Programmable Read Only Memory (EPROM for short), Programmable Red-Only Memory (PROM for short), Read-Only Memory (ROM for short), magnetic memory, flash memory, magnetic disk or optical disk.

The present application provides a computer program product, which, when running on a computer, causes the computer to execute the method in any optional implementation.

Finally, it should be noted that: the above embodiments are only used to illustrate the technical solutions of the present application, rather than limiting them; although the present application has been described in detail with reference to the foregoing embodiments, those of ordinary skill in the art should understand that: it is still possible to modify the technical solutions described in the foregoing embodiments, or perform equivalent replacements for some or all of the technical features; and these modifications or replacements do not make the essence of the corresponding technical solutions deviate from the range of the technical solutions of the embodiments of the present application, and all should be covered by the scope of the claims and description of the present application. In particular, as long as there is no structural conflict, the technical features mentioned in the embodiments can be combined with each other in any manner. The present application is not limited to the specific embodiments disclosed herein, but includes all technical solutions falling within the scope of the claims.

What is claimed is:

1. A dimension detection method for a composite surface of a battery, comprising:
acquiring image information of a cathode sheet, wherein the image information of the cathode sheet comprises an image of a first surface of the cathode sheet and an image of a second surface opposite to the first surface;
acquiring image information of a composite sheet, wherein the composite sheet comprises a non-composite surface and the composite surface, the non-composite surface is formed by compounding the first surface of the cathode sheet, an anode and a separator, the composite surface is formed by compounding the second surface of the cathode sheet, the anode and the separator, and the image information of the composite sheet comprises image information of the non-composite surface; and
calculating, through an image processing algorithm, dimension information of the composite surface according to the image information of the cathode sheet and the image information of the composite sheet, wherein the dimension information of the composite surface comprises a distance from a cathode edge to an anode edge in the composite surface, and calculating the dimension information of the composite surface comprises:
calculating, through the image processing algorithm, misalignment amount according to the image of the first surface of the cathode sheet and the image of the second surface, wherein the misalignment amount indicates a difference between a distance from a cathode edge to a ceramic edge of the first surface of the cathode sheet and a distance from a cathode edge to a ceramic edge of the second surface of the cathode sheet;
calculating a distance from a cathode edge to an anode edge in the non-composite surface according to the image information of the composite sheet; and
calculating the distance from the cathode edge to the anode edge in the composite surface according to the misalignment amount and the distance from the cathode edge to the anode edge in the non-composite surface.

2. The method according to claim 1, wherein calculating through the image processing algorithm misalignment amount according to the image of the first surface of the cathode sheet and the image of the second surface comprises:
identifying and calculating, through the image processing algorithm, a first distance from the cathode edge to the ceramic edge of the first surface of the cathode sheet according to the image of the first surface of the cathode sheet;

identifying and calculating a second distance from the cathode edge to the ceramic edge of the second surface of the cathode sheet according to the image of the second surface of the cathode sheet; and calculating a difference between the first distance and the second distance to obtain the misalignment amount.

3. The method according to claim 2, wherein identifying and calculating through the image processing algorithm the first distance from the cathode edge to the ceramic edge of the first surface of the cathode sheet according to the image of the first surface of the cathode sheet comprises:

identifying the cathode edge and the ceramic edge in the image of the first surface of the cathode sheet through the image recognition algorithm; and calculating a distance from the identified cathode edge to the ceramic edge to obtain the first distance.

4. The method according to claim 1, wherein:

the image information of the composite sheet comprises multiple composite sheet images, each of the composite sheet images comprises one corner of the composite sheet, and different composite sheet images contain different corners of the composite sheet;

calculating the distance from the cathode edge to the anode edge in the non-composite surface according to the image information of the composite sheet comprises:

calculating, according to the each composite sheet image, the distance from the cathode edge to the anode edge in the non-composite surface in a corresponding comprises sheet image; and calculating the distance from the cathode edge to the anode edge in the composite surface according to the misalignment amount and the distance from the cathode edge to the anode edge in the non-composite surface comprises:

calculating a difference between the misalignment amount and the distance from the cathode edge to the anode edge of the non-composite surface corresponding to the each composite sheet image, and obtaining the distance from the cathode edge to the anode edge of the composite surface in the each composite sheet image.

5. The method according to claim 1, further comprising, after calculating through the image processing algorithm the dimension information of the composite surface according to the image information of the cathode sheet and the image information of the composite sheet:

judging whether the dimension information of the composite surface satisfies a preset standard; and generating a re-inspection reminder of the composite sheet when the dimension information of the composite surface does not meet the preset standard.

6. The method according to claim 1, wherein:

acquiring the image information of the cathode sheet comprises:

controlling a first camera and a second camera to shoot the first surface and the second surface of the cathode sheet to obtain the image of the first surface of the cathode sheet and the image of the second surface opposite to the first surface;

positions where the first camera and the second camera are provided comprise: two sides of a cathode sheet conveying device.

7. The method according to claim 1, wherein acquiring the image information of the composite sheet comprises:

acquiring a serial number of the cathode sheet;

determine number of a to-be-triggered camera module according to the serial number of the cathode sheet; and controlling, according to the number of the to-be-triggered camera module, a corresponding camera module to shoot the composite sheet to obtain multiple composite sheet images, wherein multiple groups of camera modules are provided, and the multiple groups of camera modules are provided at two sides of a composite sheet conveying device, the numbers of the camera modules corresponding to the different groups of cameral modules are different, and each groups of camera modules comprises at least two third cameras.

8. An electronic device, comprising:

a processor; and a memory storing computer programs that, when executed by the processor, cause the processor to implement the method according to claim 1.

9. A non-transitory computer-readable storage medium storing computer programs that, when executed by a processor, cause the method according to claim 1 to be implemented.

10. A dimension detection device for a composite surface of a battery, comprising:

an acquisition module configured to:

acquire image information of a cathode sheet, wherein the image information of the cathode sheet comprises an image of a first surface of the cathode sheet and an image of a second surface opposite to the first surface; and acquire image information of a composite sheet, wherein the composite sheet comprises a non-composite surface and a composite surface, the non-composite surface is formed by compounding the first surface of the cathode sheet, an anode and a separator, the composite surface is formed by compounding the second surface of the cathode sheet, the anode and the separator, and the image information of the composite sheet comprises image information of the non-composite surface; and an image processing module configured to calculate, through an image processing algorithm, dimension information of the composite surface according to the image information of the cathode sheet and the image information of the composite sheet, wherein the dimension information of the composite surface comprises a distance from a cathode edge to an anode edge in the composite surface, and the image processing module is further configured to:

calculate, through the image processing algorithm, misalignment amount according to the image of the first surface of the cathode sheet and the image of the second surface, wherein the misalignment amount indicates a difference between a distance from a cathode edge to a ceramic edge of the first surface of the cathode sheet and a distance from a cathode edge to a ceramic edge of the second surface of the cathode sheet;

calculate a distance from a cathode edge to an anode edge in the non-composite surface according to the image information of the composite sheet; and calculate the distance from the cathode edge to the anode edge in the composite surface according to the misalignment amount and the distance from the cathode edge to the anode edge in the non-composite surface.

11. A dimension detection system for a composite surface of a battery, comprising:

at least one camera module;
a conveying device; and
a data processing device, wherein the data processing device is electrically connected to the at least one camera module;
wherein:
 the conveying device is configured to convey at least one cathode sheet and at least one composite sheet, wherein each of the at least one composite sheet comprises a non-composite surface and a composite surface, the non-composite surface is formed by compounding a first surface of the cathode sheet, an anode and a separator, and the composite surface is formed by compounding a second surface of the cathode sheet, the anode and the separator; and
 the data processing device is configured to:
  control the at least one camera module to shoot each of the at least one cathode sheet on the conveying device to obtain image information of the cathode sheet, wherein the image information of the cathode sheet comprises an image of the first surface of the cathode sheet and an image of the second surface opposite to the first surface;
  control the at least one camera module to shoot each of the at least one composite sheet on the conveying device to obtain image information of the composite sheet, wherein the image information of the composite sheet comprises image information of a non-composite surface; and
  calculate, through an image processing algorithm, dimension information of the composite surface according to the image information of the cathode sheet and the image information of the composite sheet, wherein the dimension information of the composite surface comprises a distance from a cathode edge to an anode edge in the composite surface, and calculating the dimension information of the composite surface comprises:
   calculating, through the image processing algorithm, misalignment amount according to the image of the first surface of the cathode sheet and the image of the second surface, wherein the misalignment amount indicates a difference between a distance from a cathode edge to a ceramic edge of the first surface of the cathode sheet and a distance from a cathode edge to a ceramic edge of the second surface of the cathode sheet;
   calculating a distance from a cathode edge to an anode edge in the non-composite surface according to the image information of the composite sheet; and
   calculating the distance from the cathode edge to the anode edge in the composite surface according to the misalignment amount and the distance from the cathode edge to the anode edge in the non-composite surface.

* * * * *